(12) United States Patent
Yang (10) Patent No.: US 10,354,254 B2
(45) Date of Patent: Jul. 16, 2019

(54) DATA PROCESSING METHOD AND SYSTEM, TERMINAL, AND SERVER

(71) Applicant: Huawei Technologies Co., Ltd., Shenzhen (CN)

(72) Inventor: Bing Yang, Kuala Lumpur (MY)

(73) Assignee: Huawei Technologies Co., Ltd., Shenzhen (CN)

( * ) Notice: Subject to any disclaimer, the term of this patent is extended or adjusted under 35 U.S.C. 154(b) by 795 days.

(21) Appl. No.: 14/896,593

(22) PCT Filed: Jun. 6, 2014

(86) PCT No.: PCT/CN2014/079321
§ 371 (c)(1),
(2) Date: Dec. 7, 2015

(87) PCT Pub. No.: WO2014/194853
PCT Pub. Date: Dec. 11, 2014

(65) Prior Publication Data
US 2016/0148208 A1    May 26, 2016

(30) Foreign Application Priority Data

Jun. 8, 2013 (CN) .......................... 2013 1 0228324

(51) Int. Cl.
*G06Q 20/10* (2012.01)
*G06Q 20/40* (2012.01)
(Continued)

(52) U.S. Cl.
CPC ....... *G06Q 20/407* (2013.01); *G06Q 10/0837* (2013.01); *G06Q 10/10* (2013.01);
(Continued)

(58) Field of Classification Search
CPC .............................. G06Q 20/10; G06Q 20/40
(Continued)

(56) References Cited

U.S. PATENT DOCUMENTS

| 2001/0047315 | A1* | 11/2001 | Siegel | G06Q 10/087 705/28 |
| 2003/0115135 | A1 | 6/2003 | Sarfraz et al. | |
| 2008/0102816 | A1* | 5/2008 | Shan | H04W 8/02 455/424 |

FOREIGN PATENT DOCUMENTS

| CN | 101562624 A | 10/2009 |
| CN | 102982479 A | 3/2013 |

(Continued)

*Primary Examiner* — Hai Tran
(74) *Attorney, Agent, or Firm* — Leydig, Voit & Mayer, Ltd.

(57) ABSTRACT

Implementation manners of the present invention disclose a data processing method and system, a terminal, and a server, where the data processing method includes: acquiring a service processing instruction inputted by a user; generating a service processing request according to the service processing instruction, where the service processing request includes a unique identifier of the terminal; and sending the service processing request to a server, so that the server queries, according to the unique identifier of the terminal in the service processing request, an on-sale data maintenance list for product information corresponding to the unique identifier of the terminal; and processing, according to the product information corresponding to the unique identifier of the terminal, a service requested by the service processing request. The technical solutions disclosed by the present invention require no complex manual operations, thereby decreasing an error rate, improving a service processing speed.

19 Claims, 5 Drawing Sheets

(51) Int. Cl.
*G06Q 10/10* (2012.01)
*G06Q 10/00* (2012.01)
*G06Q 30/00* (2012.01)
*G06Q 10/08* (2012.01)
*G06Q 20/32* (2012.01)

(52) U.S. Cl.
CPC ......... *G06Q 10/20* (2013.01); *G06Q 20/3227* (2013.01); *G06Q 30/01* (2013.01)

(58) Field of Classification Search
USPC .......................................................... 705/39
See application file for complete search history.

(56) References Cited

FOREIGN PATENT DOCUMENTS

| | | |
|---|---|---|
| CN | 103310370 A | 9/2013 |
| EP | 1874067 A1 | 1/2008 |

* cited by examiner

DATA PROCESSING METHOD AND SYSTEM, TERMINAL, AND SERVER

CROSS-REFERENCE TO RELATED APPLICATIONS

This application is a National Stage of International Application No. PCT/CN2014/079321, filed on Jun. 6, 2014, which claims priority to Chinese Patent Application No. 201310228324.6, filed on Jun. 8, 2013, both of which are hereby incorporated by reference in their entireties.

TECHNICAL FIELD

The present invention relates to the field of information technologies, and in particular, to a data processing method and system, a terminal, and a server.

BACKGROUND

With the extensive application of e-commerce services in life, online shopping has become one of the main manners of the e-commerce services. After a terminal such as a mobile phone, a tablet computer or a smart television is purchased on a shopping platform provided by a server, in the prior art, a user needs to manually input a unique identifier of the terminal to the shopping platform provided by the server, and meanwhile, a seller may also need to make a corresponding input on the server, which has disadvantages of complex operations, poor security and poor user experience.

To further describe the foregoing disadvantages of the prior art clearly, that a server performs refund service processing on a terminal is used as an example for specific description below.

Because of the particularity of remote shopping, a buyer can receive a commodity only after browsing a picture of a terminal online, and placing an order to buy the commodity corresponding to the picture. Therefore, an incident occurring in the post or other various uncertainties that can be imagined may lead to inconsistency between the commodity received by the buyer and an actual commodity. As a result, refund is needed in many cases.

Refund cannot be executed simply. Refund can be performed only after operations such as goods return and goods warehousing are completed, so as to ensure interests of both the buyer and a seller. Therefore, at present, a technology used for refund of the terminal purchased online is generally that: a user accesses, by using an Internet access device, a shopping mall web page provided by the seller, fills in related information such as an order, a commodity, and an unique identifier of the commodity on the shopping mall web page, and submits a return or exchange application on the shopping mall web page.

Specifically, for the terminal, in order to ensure that the returned terminal is the commodity sold by the seller, the seller requires the buyer to provide the unique identifier of the terminal, while the user needs some skills to acquire the unique identifier. For example, for a mobile phone, *#06# needs to be inputted by using a keyboard, and then an IMEI (International Mobile Equipment Identity) code, as the unique identifier of the mobile phone, can be acquired.

Figure 1:
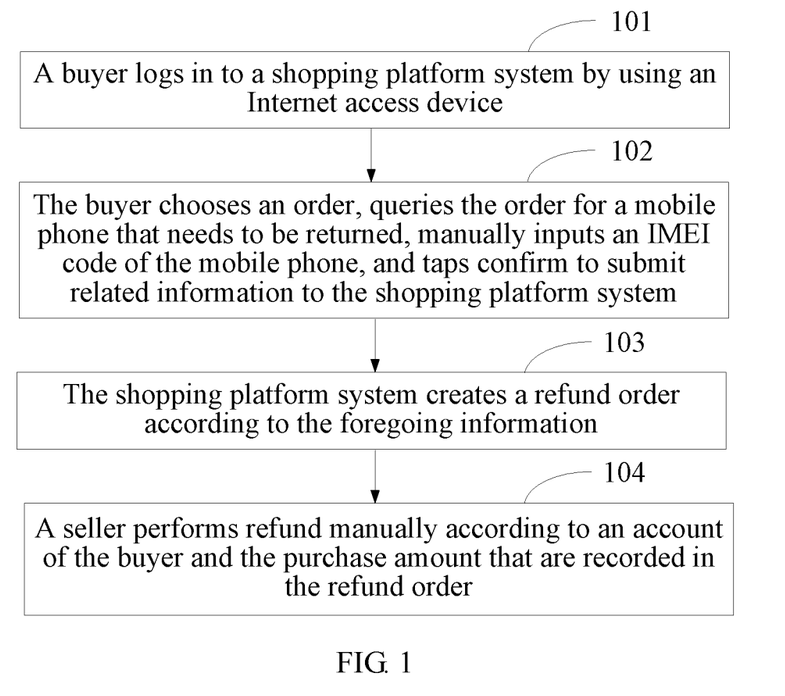
FIG. 1 is a flowchart of a refund method for a mobile phone in the prior art.

The following uses a mobile phone as a specific example of the terminal for description of the prior art. In the prior art, after a buyer buys a mobile phone online, if refund is required, the buyer may access, by using an Internet access device such as a mobile phone or a computer of a third party, a shopping mall web page provided by a seller, so as to log in to a website of an e-mall to perform a complex return and refund application. With this technology, the buyer at least needs to perform several operations. For details, refer to FIG. 1. FIG. 1 is a flowchart of a refund method for a mobile phone in the prior art. As shown in FIG. 1, the refund method for a mobile phone in the prior art includes the following steps:

Step 101. A buyer logs in to a shopping platform system by using an Internet access device. Specifically, the buyer can log in to a web page provided by the shopping platform system.

Step 102. The buyer chooses an order, queries the order for a mobile phone to be returned, manually inputs an IMEI code of the mobile phone, taps confirm, and submits related information to the shopping platform system. The related information includes the order and the IMEI code of the mobile phone.

Step 103. The shopping platform system creates a refund order according to the foregoing related information, where the refund order includes an account of the buyer and a purchase amount.

Step 104. The seller performs refund manually according to the account of the buyer and the purchase amount that are recorded in the refund order.

According to the refund method for a mobile phone in the prior art, the buyer needs to manually input the IMEI code, and the IMEI code can be acquired only after *#06190 is inputted by using a keyboard of the purchased mobile phone. This process is relatively complex, error-prone, and time-consuming. In addition, after the mobile phone is warehoused, the seller further needs to manually query for the account of the buyer and a product price that are recorded in the order, and make a refund manually to the buyer. This process also seems complex, and manual operations are error-prone and time-consuming.

SUMMARY

Implementation manners of the present invention provide a data processing method and system, a terminal, and a server, which require no complex manual operations, thereby decreasing an error rate, improving a service processing speed, and bringing about good user experience.

According to a first aspect, a data processing method is provided, including: acquiring, by a terminal, a service processing instruction inputted by a user; generating, by the terminal, a service processing request according to the service processing instruction, where the service processing request includes a unique identifier of the terminal; sending, by the terminal, the service processing request to a server; receiving, by the server, the service processing request; querying, by the server according to the unique identifier of the terminal in the service processing request, an on-sale data maintenance list for product information corresponding to the unique identifier of the terminal, where the on-sale data maintenance list records a correspondence between a unique identifier of at least one sold terminal and product information corresponding to the unique identifier of the sold terminal; and processing, by the server according to the product information corresponding to the unique identifier of the terminal, a service requested by the service processing request.

In a first possible implementation manner of the first aspect, the service processing request is a refund service request; the product information includes a product price and a payment account corresponding to the terminal; and the processing, by the server according to the product information, the service corresponding to the terminal includes: performing, by the server, refund processing for the terminal according to the product price and the payment account.

In a second possible implementation manner of the first aspect, the service processing request is a software update service request; the product information includes an operating system update software package corresponding to the terminal; and the processing, by the server according to the product information, the service corresponding to the terminal includes: sending, by the server, the operating system update software package to the terminal, so that the terminal updates an operating system of the terminal according to the operating system update software package.

With reference to any one of the first aspect, the first possible implementation manner of the first aspect, and the second possible implementation manner of the first aspect, in a third possible implementation manner of the first aspect, the unique identifier includes an IMEI code, an ESN code, an MEID code, and an SN code.

According to a second aspect, a data processing method is provided, including: acquiring a service processing instruction inputted by a user; generating a service processing request according to the service processing instruction, where the service processing request includes a unique identifier of a terminal; sending the service processing request to a server, so that the server queries, according to the unique identifier of the terminal in the service processing request, an on-sale data maintenance list for product information corresponding to the unique identifier of the terminal, where the on-sale data maintenance list records a correspondence between a unique identifier of at least one sold terminal and product information corresponding to the unique identifier of the sold terminal; and processing, according to the product information corresponding to the unique identifier of the terminal, a service requested by the service processing request.

In a first possible implementation manner of the second aspect, the unique identifier includes an IMEI code, an ESN code, an MEID code, and an SN code.

According to a third aspect, a data processing method is provided, including: receiving a service processing request sent by a terminal, where the service processing request includes a unique identifier of the terminal; querying, according to the unique identifier of the terminal in the service processing request, an on-sale data maintenance list for product information corresponding to the unique identifier of the terminal, where the on-sale data maintenance list records a correspondence between a unique identifier of at least one sold terminal and product information corresponding to the unique identifier of the sold terminal; and processing, according to the product information corresponding to the unique identifier of the terminal, a service requested by the service processing request.

In a first possible implementation manner of the third aspect, the service processing request is a refund service request; the product information includes a product price and a payment account corresponding to the terminal; and the processing, according to the product information, the service corresponding to the terminal includes: performing refund processing for the terminal according to the product price and the payment account.

In a second possible implementation manner of the third aspect, the service processing request is a software update service request; the product information includes an operating system update software package corresponding to the terminal; and the processing, according to the product information, the service corresponding to the terminal includes: sending the operating system update software package to the terminal, so that the terminal updates an operating system of the terminal according to the operating system update software package.

With reference to any one of the third aspect, the first possible implementation manner of the third aspect, and the second possible implementation manner of the third aspect, in a third possible implementation manner of the third aspect, the unique identifier includes an IMEI code, an ESN code, an MEID code, and an SN code.

According to a fourth aspect, a data processing system is provided, including: a terminal, including: a human-machine interface, configured to acquire a service processing instruction inputted by a user; a service processing request generating module, configured to generate a service processing request according to the service processing instruction, where the service processing request includes a unique identifier of the terminal; and a sending module, configured to send the service processing request to a server; and the server, including: a receiving module, configured to receive the service processing request; a storing module, configured to store an on-sale data maintenance list, where the on-sale data maintenance list records a correspondence between a unique identifier of at least one sold terminal and product information corresponding to the unique identifier; a querying module, configured to query, according to the unique identifier of the terminal in the service processing request, the on-sale data maintenance list for product information corresponding to the unique identifier of the terminal; and a service processing module, configured to process, according to the product information corresponding to the unique identifier of the terminal, a service requested by the service processing request.

In a first possible implementation manner of the fourth aspect, the service processing request is a refund service request; the product information includes a product price and a payment account corresponding to the terminal; and the service processing module is configured to: perform refund processing for the terminal according to the product price and the payment account.

In a second possible implementation manner of the fourth aspect, the service processing request is a software update service request; the product information includes an operating system update software package corresponding to the terminal; and the service processing module is configured to: send the operating system update software package to the terminal, so that the terminal updates an operating system of the terminal according to the operating system update software package.

With reference to any one of the fourth aspect, the first possible implementation manner of the fourth aspect, and the second possible implementation manner of the fourth aspect, in a third possible implementation manner of the fourth aspect, the unique identifier includes an IMEI code, an ESN code, an MEID code, and an SN code.

According to a fifth aspect, a terminal is provided, including: a human-machine interface, configured to acquire a service processing instruction inputted by a user; a service processing request generating module, configured to generate a service processing request according to the service processing instruction, where the service processing request includes a unique identifier of the terminal; and a sending module, configured to send the service processing request to a server, so that the server queries, according to the unique identifier of the terminal in the service processing request, an on-sale data maintenance list for product information corresponding to the unique identifier of the terminal, where the on-sale data maintenance list records a correspondence between a unique identifier of at least one sold terminal and product information corresponding to the unique identifier of the sold terminal, and processes, according to the product information corresponding to the unique identifier of the terminal, a service requested by the service processing request.

In a first possible implementation manner of the fifth aspect, the unique identifier includes an IMEI code, an ESN code, an MEID code, and an SN code.

According to a sixth aspect, a server is provided, including: a receiving module, configured to receive a service processing request sent by a terminal, where the service processing request includes a unique identifier of the terminal; a storing module, configured to store an on-sale data maintenance list, where the on-sale data maintenance list records a correspondence between a unique identifier of at least one sold terminal and product information corresponding to the unique identifier; a querying module, configured to query, according to the unique identifier of the terminal in the service processing request, the on-sale data maintenance list for product information corresponding to the unique identifier of the terminal; and a service processing module, configured to process, according to the product information corresponding to the unique identifier of the terminal, a service requested by the service processing request.

In a first possible implementation manner of the sixth aspect, the service processing request is a refund service request; the product information includes a product price and a payment account corresponding to the terminal; and the service processing module is configured to: perform refund processing for the terminal according to the product price and the payment account.

In a second possible implementation manner of the sixth aspect, the service processing request is a software update service request; the product information includes an operating system update software package corresponding to the terminal; and the service processing module is configured to: send the operating system update software package to the terminal, so that the terminal updates an operating system of the terminal according to the operating system update software package.

With reference to any one of the sixth aspect, the first possible implementation manner of the sixth aspect, and the second possible implementation manner of the sixth aspect, in a third possible implementation manner of the sixth aspect, the unique identifier includes an IMEI code, an ESN code, an MEID code, and an SN code.

Different from the prior art, according to the data processing method and system, the terminal, and the server provided by the embodiments of the present invention, after acquiring a service processing instruction inputted by a user, the terminal automatically generates a service processing request including a unique identifier of the terminal, and sends the service processing request to the server; and the server queries, according to the unique identifier of the terminal in the service processing request, an on-sale data maintenance list for product information corresponding to the unique identifier of the terminal, and processes, according to the product information corresponding to the unique identifier of the terminal, a service requested by the service processing request. A buyer only needs to simply input the service processing instruction to the terminal, and a seller does not need to perform any operation. Therefore, according to the present invention, no complex manual operations are required, thereby decreasing an error rate, improving a service processing speed, and bringing about good user experience.

DESCRIPTION OF EMBODIMENTS

The following describes the present invention in detail with reference to the accompanying drawings and implementation manners.

Figure 2:
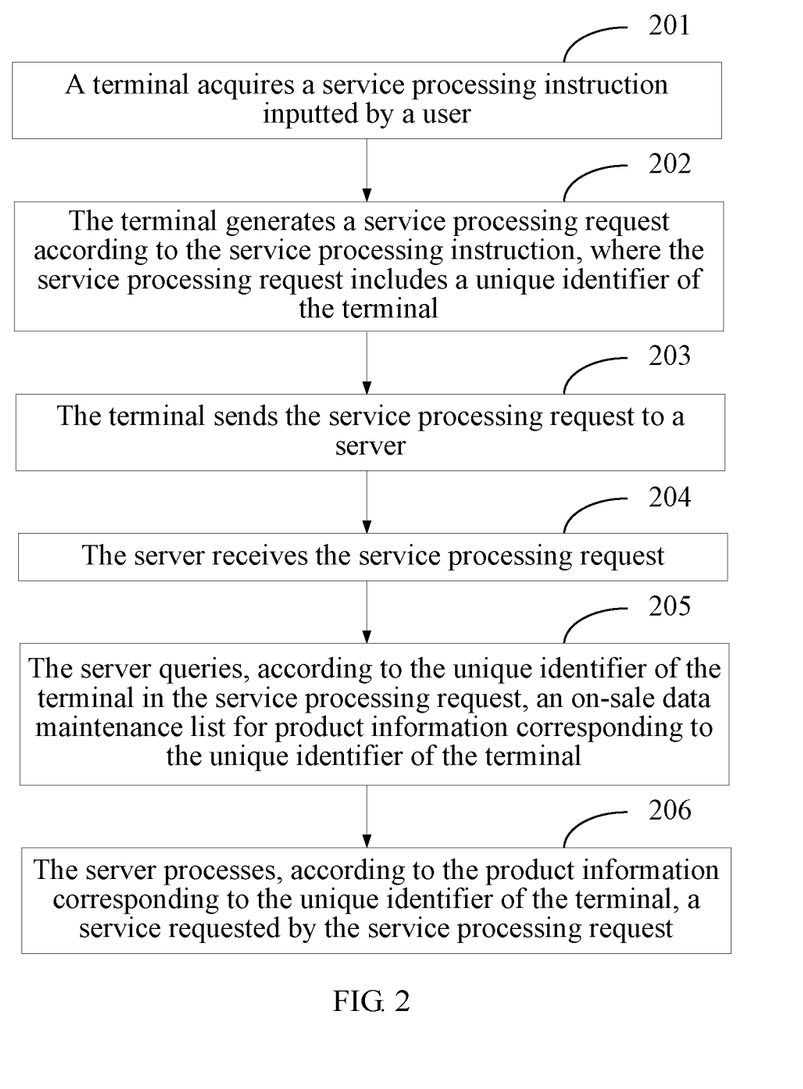
FIG. 2 is a flowchart of a first embodiment of a data processing method according to the present invention.

Referring to FIG. 2, FIG. 2 is a flowchart of a first embodiment of a data processing method according to the present invention. As shown in FIG. 2, the data processing method of the present invention includes the following steps:

Step 201. A terminal acquires a service processing instruction inputted by a user.

Step 202. The terminal generates a service processing request according to the service processing instruction, where the service processing request includes a unique identifier of the terminal. Optionally, the unique identifier may specifically be an IMEI code, an ESN (Emergency Service Number) code, an MEID (Mobile Equipment Identifier) code, or an SN (Serial Number) code. The terminal may be a PDA (Personal Digital Assistant, personal digital assistant), a smart phone, a tablet computer, a notebook computer, a desktop computer, a smart television, or the like. Specifically, the IMEI code, the ESN code, the MEID code, or the SN code may be used as the unique identifier of the smart phone, and the SN code may be used as the unique identifier of the PDA, the tablet computer, the notebook computer, the desktop computer, or the smart television.

Step 203. The terminal sends the service processing request to a server.

Step 204. The server receives the service processing request.

Step 205. The server queries, according to the unique identifier of the terminal in the service processing request, an on-sale data maintenance list for product information corresponding to the unique identifier of the terminal. The on-sale data maintenance list records a correspondence between a unique identifier of at least one sold terminal and product information corresponding to the unique identifier of the sold terminal.

Step 206. The server processes, according to the product information corresponding to the unique identifier of the terminal, a service requested by the service processing request.

Optionally, the product information includes a product price and a payment account corresponding to the terminal.

The service processing instruction inputted by the user in step 201 is specifically used to instruct to start a refund service, and correspondingly, the service processing request generated by the terminal according to the service processing instruction in step 202 is a refund service request, and in step 206, the server performs refund processing for the terminal according to the product price and the payment account.

Optionally, the product information may also include an operating system update software package corresponding to the terminal. The service instruction inputted by the user in step 201 is specifically used to instruct to start a software update service, and correspondingly, the service processing request generated by the terminal according to the service processing instruction in step 202 is a software update service request, and in step 206, the server sends the operating system update software package to the terminal, so that the terminal updates an operating system of the terminal according to the operating system update software package.

It should be noted that, the foregoing lists only two optional specific implementation manners based on the idea of the present invention, that is, the server starts the refund service for the sold terminal and the server starts the software update service for the sold terminal. However, a person skilled in the art should understand that the present invention can also include various variations derived from the foregoing examples without departing from the idea of the present invention, for example, the server starts an automobile maintenance service for the terminal, the server starts a weather forecast service for the terminal, and the like.

In this embodiment, the service processing instruction is inputted by a buyer on the terminal, which may be specifically completed by the buyer by pressing a key of an input device (such as a key or a touchscreen) corresponding to the terminal or inputting a specific command. For example, if the terminal is a smart phone provided with an Android OS (Android Operating System), the terminal can invoke an API (Application Programming Interface, application programming interface) of the Android OS according to the service processing instruction, as shown in Table 1.

TABLE 1 public class
    elephonyManager
    extends Object
    java. lang. Object
    android. telephony. TelephonyManager
    Public String getDeviceId( )
    //Returns the unique device ID, for example, the IMEI for GSM and the MEID or ESN for CDMA phones. Return null if device ID is not available.
    Requires Permission: READ_PHONE_STATE Therefore, as shown in Table 1, the smart phone can acquire the unique identifier (which is an IMEI code herein) from a mobile phone manufacturer by using the API of the Android OS.

For example, the server may also provide a sending interface, where the sending interface is preferably a web service (web service) interface, and may also be implemented by using another interface. Before sending the service processing request including the unique identifier, the smart phone may encrypt the unique identifier, so as to prevent data leakage. Table 2 shows parameters of the web service interface provided by the server.

TABLE 2

| Interface name | bindingRMA | | |
|---|---|---|---|
| Parameter description | xml characters in the following format: <BindingRma> <checkWord>access verification code<checkWord> <rma> < property name= "IMEI" VALUE="encrypted IMEI code"/> </rma> <BindingRma> Description of meanings of fields: | | |
| | Code | Description | Cause and processing |
| Return value description | 00** | Normal | |
| | 0000 | Operation succeeded | |
| | 02** | Lack mandatory parameter | This code occurs when a required parameter does not meet a requirement, and does not occur in a normal service process. |
| | 0201 | Lack mandatory parameter | Same as above |
| | 10** | System error | |
| | 1001 | Runtime exception occurred in system | Same as above |
| Other exception types | Exception that may occur in the system during interface invoking: 1. An invoking failure or an invoking timeout exception occurs when a network is congested. | | |
| Active invoking party | Terminal | | |
| Service provider | Server | | |

After acquiring a service processing instruction inputted by a user, a terminal automatically generates a service processing request including a unique identifier of the terminal, and sends the service processing request to a server; and the server queries, according to the unique identifier of the terminal in the service processing request, an on-sale data maintenance list for product information corresponding to the unique identifier of the terminal, and processes, according to the product information corresponding to the unique identifier of the terminal, a service requested by the service processing request. A buyer only needs to simply input the service processing instruction to the terminal, and a seller does not need to perform any operation. Therefore, according to the present invention, no complex manual operations are required, thereby decreasing an error rate, improving a service processing speed, and bringing about good user experience.

Figure 3:
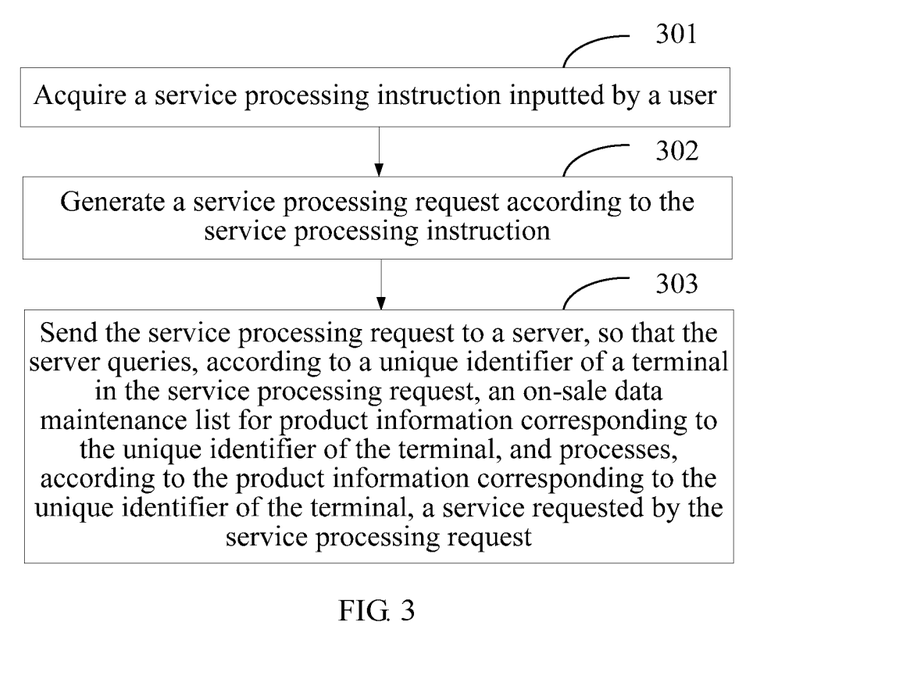
FIG. 3 is a flowchart of a second embodiment of a data processing method according to the present invention.

Referring to FIG. 3, FIG. 3 is a flowchart of a second embodiment of a data processing method according to the present invention. As shown in FIG. 3, the data processing method of the present invention includes the following steps:

Step 301. Acquire a service processing instruction inputted by a user.

Step 302. Generate a service processing request according to the service processing instruction, where the service processing request includes a unique identifier of a terminal.

Step 303. Send the service processing request to a server, so that the server queries, according to the unique identifier of the terminal in the service processing request, an on-sale data maintenance list for product information corresponding to the unique identifier of the terminal, and processes, according to the product information corresponding to the unique identifier of the terminal, a service requested by the service processing request. The on-sale data maintenance list records a correspondence between a unique identifier of at least one sold terminal and product information corresponding to the unique identifier of the sold terminal.

The unique identifier includes an IMEI code, an ESN code, an MEID code, and an SN code.

In this embodiment, a terminal is used as the main part for description. After acquiring a service processing instruction inputted by a user, the terminal automatically generates a service processing request including a unique identifier of the terminal, and sends the service processing request to a server; and the server queries, according to the unique identifier of the terminal in the service processing request, an on-sale data maintenance list for product information corresponding to the unique identifier of the terminal, and processes, according to the product information corresponding to the unique identifier of the terminal, a service requested by the service processing request. A buyer only needs to simply input the service processing instruction to the terminal, and a seller does not need to perform any operation. Therefore, according to the present invention, no complex manual operations are required, thereby decreasing an error rate, improving a service processing speed, and bringing about good user experience.

Figure 4:
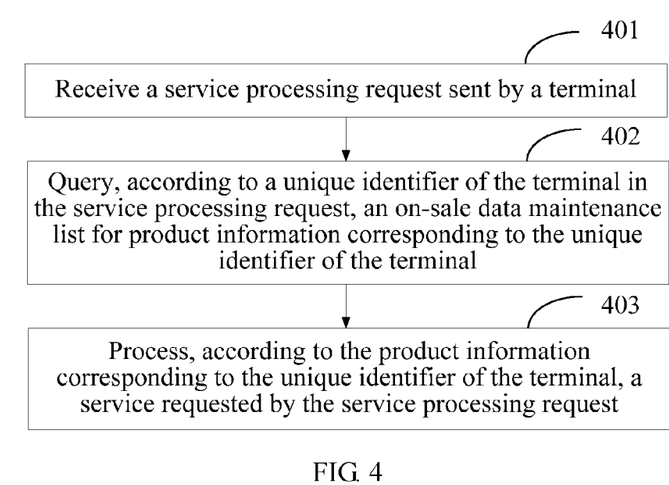
FIG. 4 is a flowchart of a third embodiment of a data processing method according to the present invention.

Referring to FIG. 4, FIG. 4 is a flowchart of a third embodiment of a data processing method according to the present invention. As shown in FIG. 4, the data processing method of the present invention includes the following steps:

Step 401. Receive a service processing request sent by a terminal, where the service processing request includes a unique identifier of the terminal.

Step 402. Query, according to the unique identifier of the terminal in the service processing request, an on-sale data maintenance list for product information corresponding to the unique identifier of the terminal. The on-sale data maintenance list records a correspondence between a unique identifier of at least one sold terminal and product information corresponding to the unique identifier of the sold terminal.

Step 403. 1 Process, according to the product information corresponding to the unique identifier of the terminal, a service requested by the service processing request.

The unique identifier includes an IMEI code, an ESN code, an MEID code, and an SN code.

In this embodiment, a server is used as the main part for description. The server queries, according to a unique identifier of a terminal in a service processing request, an on-sale data maintenance list for product information corresponding to the unique identifier of the terminal, and processes, according to the product information corresponding to the unique identifier of the terminal, a service requested by the service processing request. A seller does not need to perform any operation. Therefore, according to the present invention, no complex manual operations are required, thereby decreasing an error rate, improving a service processing speed, and bringing about good user experience.

Figure 5:
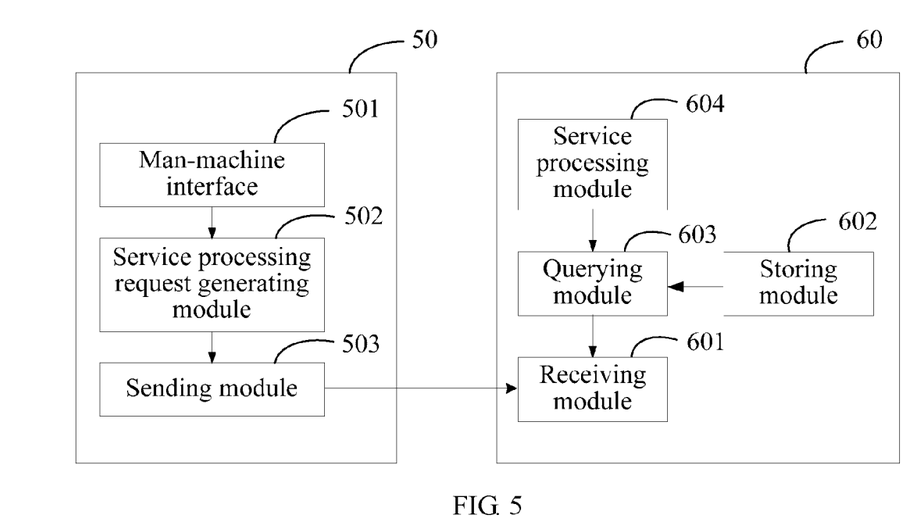
FIG. 5 is a schematic structural diagram of a first embodiment of a data processing system according to the present invention.

Referring to FIG. 5, FIG. 5 is a schematic structural diagram of a first embodiment of a data processing system according to the present invention. As shown in FIG. 5, the data processing system includes a terminal 50 and a server 60.

The terminal 50 includes a human-machine interface 501, a service processing request generating module 502, and a sending module 503, where:

the human-machine interface 501 is configured to acquire a service processing instruction inputted by a user;

the service processing request generating module 502 is configured to generate a service processing request according to the service processing instruction, where the service processing request includes a unique identifier of the terminal 50; and the sending module 503 is configured to send the service processing request to the server 60, so that the server 60 queries, according to the unique identifier of the terminal 50 in the service processing request, an on-sale data maintenance list for product information corresponding to the unique identifier of the terminal 50, where the on-sale data maintenance list records a correspondence between a unique identifier of at least one sold terminal 50 and product information corresponding to the unique identifier of the sold terminal 50, and processes, according to the product information corresponding to the unique identifier of the terminal 50, a service requested by the service processing request.

Specifically, the server 60 includes a receiving module 601, a storing module 602, a querying module 603, and a service processing module 604, where:

the receiving module 601 is configured to receive the service processing request;

the storing module 602 is configured to store the on-sale data maintenance list, where the on-sale data maintenance list records the correspondence between the unique identifier of the at least one sold terminal 50 and the product information corresponding to the unique identifier;

the querying module 603 is configured to query, according to the unique identifier of the terminal 50 in the service processing request, the on-sale data maintenance list for the product information corresponding to the unique identifier of the terminal 50; and the service processing module 604 is configured to process, according to the product information corresponding to the unique identifier of the terminal 50, the service requested by the service processing request.

The unique identifier includes an IMEI code, an ESN code, an MEID code, and an SN code.

Optionally, the product information includes a product price and a payment account corresponding to the terminal 50, where the service processing instruction inputted by the user is specifically used to instruct to start a refund service, and correspondingly, the service processing request generated by the service processing request generating module 502 of the terminal 50 according to the service processing instruction is a refund service request; and the service processing module 604 of the server 60 performs refund processing for the terminal 50 according to the product price and the payment account.

Optionally, the product information may also include an operating system update software package corresponding to the terminal 50, where the service indication inputted by the user is specifically used to instruct to start a software update service, and correspondingly, the service processing request generated by the service processing request generating module 502 of the terminal 50 according to the service processing instruction is a software update service request; and the service processing module 604 of the server 60 sends the operating system update software package to the terminal 50, so that the terminal 50 updates an operating system of the terminal 50 according to the operating system update software package.

It should be noted that, the foregoing lists only two optional specific implementation manners based on the idea of the present invention, that is, the server 60 starts the refund service for the sold terminal 50 and the server 60 starts the software update service for the sold terminal 50. However, a person skilled in the art should understand that the present invention can also include various variations derived from the foregoing examples without departing from the idea of the present invention, for example, the server 60 starts an automobile maintenance service for the terminal 50, and the server 60 starts a weather forecast service for the terminal 50.

Therefore, after acquiring a service processing instruction inputted by a user, a terminal 50 automatically generates a service processing request including a unique identifier of the terminal 50, and sends the service processing request to a server 60; and the server 60 queries, according to the unique identifier of the terminal 50 in the service processing request, an on-sale data maintenance list for product information corresponding to the unique identifier of the terminal 50, and processes, according to the product information corresponding to the unique identifier of the terminal 50, a service requested by the service processing request. A buyer only needs to simply input the service processing instruction to the terminal 50, and a seller does not need to perform any operation. Therefore, according to the present invention, no complex manual operations are required, thereby decreasing an error rate, improving a service processing speed, and bringing about good user experience.

Figure 6:
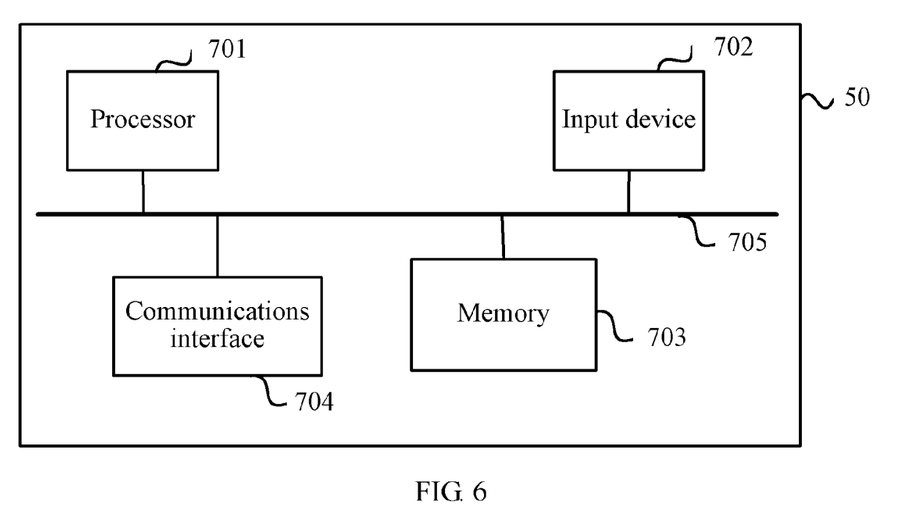
FIG. 6 is a schematic structural diagram of an embodiment of a terminal according to the present invention.

Referring to FIG. 6, FIG. 6 is a schematic structural diagram of an embodiment of a terminal according to the present invention. As shown in FIG. 6, a terminal 50 includes a processor 701, an input device 702, a memory 703, a communications interface 704, and a bus 705, where the memory 703, the processor 701, the communications interface 704, and the input device 702 are separately connected to the bus 705, so as to perform data exchange and communication by using the bus 705.

The input device 702 is configured to acquire a service processing instruction inputted by a user.

The memory 703 is configured to store a program, where the program is used to generate a service processing request according to the service processing instruction, and the service processing request includes a unique identifier of the terminal 50.

The processor 701 is configured to run the foregoing program.

The communications interface 704 is configured to send the service processing request to a server 60.

The unique identifier includes an IMEI code, an ESN code, an MEID code, and an SN code.

After the communications interface sends the service processing request to the server 60, the server 60 can query, according to the unique identifier of the terminal 50 in the service processing request, an on-sale data maintenance list for product information corresponding to the unique identifier of the terminal 50, where the on-sale data maintenance list records a correspondence between a unique identifier of at least one sold terminal 50 and product information corresponding to the unique identifier of the sold terminal 50; and process, according to the product information corresponding to the unique identifier of the terminal 50, a service requested by the service processing request. Specific technical details of the server 60 will be discussed below.

Figure 7:
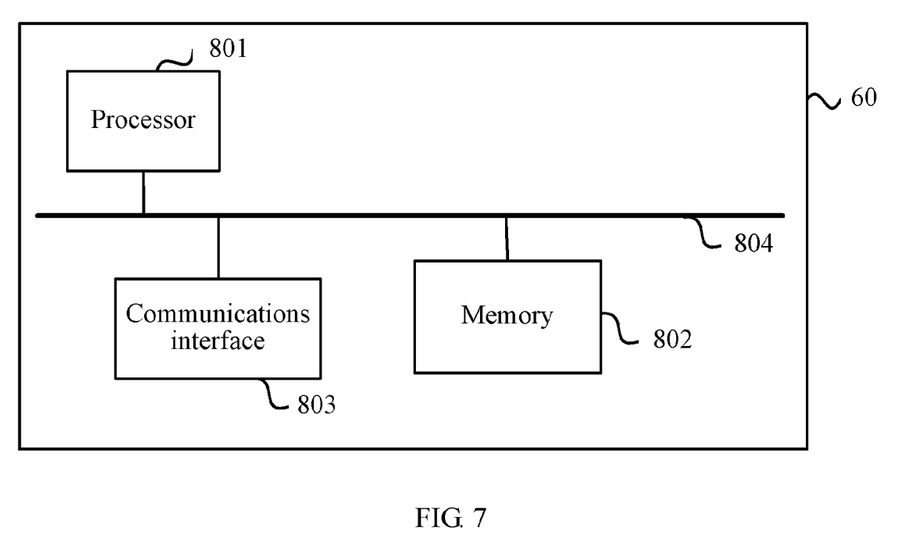
FIG. 7 is a schematic structural diagram of an embodiment of a server according to the present invention.

Referring to FIG. 7, FIG. 7 is a schematic structural diagram of an embodiment of a server according to the present invention. As shown in FIG. 7, the server 60 includes a processor 801, a memory 802, a communications interface 803, and a bus 804, where the memory 802, the processor 801, and the communications interface 803 are separately connected to the bus 804, so as to perform data exchange and communication by using the bus 804.

The communications interface 803 is configured to receive a service processing request sent by a terminal 50, where the service processing request includes a unique identifier of the terminal 50.

The memory 802 is configured to store an on-sale data maintenance list and a program, where the on-sale data maintenance list records a correspondence between a unique identifier of at least one sold terminal 50 and product information corresponding to the unique identifier; and the program is used to query, according to the unique identifier of the terminal 50 in the service processing request, the on-sale data maintenance list for the product information corresponding to the unique identifier of the terminal 50, and process, according to the product information corresponding to the unique identifier of the terminal 50, a service requested by the service processing request.

The processor 801 is configured to run the foregoing program.

The unique identifier includes an IMEI code, an ESN code, an MEID code, and an SN code.

Optionally, the service processing request is a refund service request; the product information includes a product price and a payment account corresponding to the terminal 50; and the foregoing program is specifically used to perform refund processing for the terminal 50 according to the product price and the payment account.

Optionally, the service processing request is a software update service request; the product information includes an operating system update software package corresponding to the terminal 50; and the communications interface is further configured to send the operating system update software package to the terminal 50, so that the terminal 50 updates an operating system of the terminal 50 according to the operating system update software package.

Therefore, according to the content disclosed above, in the technical solutions disclosed by the embodiments of the present invention, after acquiring a service processing instruction inputted by a user, a terminal automatically generates a service processing request including a unique identifier of the terminal, and sends the service processing request to a server; and the server queries, according to the unique identifier of the terminal in the service processing request, an on-sale data maintenance list for product information corresponding to the unique identifier of the terminal, and processes, according to the product information corresponding to the unique identifier of the terminal, a service requested by the service processing request. A buyer only needs to simply input the service processing instruction to the terminal, and a seller does not need to perform any operation. Therefore, according to the present invention, no complex manual operations are required, thereby decreasing an error rate, improving a service processing speed, and bringing about good user experience.

In addition, in the several implementation manners provided in this application, it should be understood that the disclosed system, apparatus, and method may be implemented in other manners. For example, the described implementation manners of the apparatus embodiment are merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners of the embodiments.

In addition, functional units in the implementation manners of the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the implementation manners of the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely implementation manners of the present invention, but are not intended to limit the patent scope of the present invention. An equivalent structural or equivalent process alternation made by using the content of the specification and accompanying drawings of the present invention or directly or indirectly applied to another related technical field shall fall within the patent protection scope of the present invention.

What is claimed is:

1. A data processing method for automatically generating a service request by a sold terminal in response to an instruction input by a user of the sold terminal, the method comprising:

acquiring, by a terminal, a service processing instruction inputted by a user, wherein the terminal is a sold terminal via which the user inputs the service process instruction;

generating, by the terminal, a service processing request according to the service processing instruction, wherein the service processing request comprises a unique identifier of the terminal;

sending, by the terminal, the service processing request to a server;

receiving, by the server, the service processing request;

querying, by the server according to the unique identifier of the terminal in the service processing request, an on-sale data maintenance list for product information corresponding to the unique identifier of the terminal, wherein the on-sale data maintenance list records a correspondence between a unique identifier of at least one sold terminal and product information corresponding to the unique identifier of the at least one sold terminal; and processing, by the server according to the product information corresponding to the unique identifier of the terminal, a service requested by the service processing request.

2. The method according to claim 1, wherein the service processing request is a refund service request; the product information comprises a product price and a payment account corresponding to the terminal; and the processing, by the server according to the product information, the service requested by the service processing request corresponding to the terminal comprises:

performing, by the server, refund processing of the terminal according to the product price and the payment account.

3. The method according to claim 1, wherein the service processing request is a software update service request; the product information comprises an operating system update software package corresponding to an operating system of the terminal; and the processing, by the server according to the product information, the service requested by the service processing request corresponding to the terminal comprises:

sending, by the server, the operating system update software package to the terminal, to enable the terminal to update the operating system of the terminal according to the operating system update software package.

4. The method according to claim 1, wherein the unique identifier comprises one of an International Mobile Equipment Identity (IMEI) code, an Emergency Service Number (ESN) code, a Mobile Equipment Identifier (MEID) code, or a Serial Number (SN) code.

5. A data processing method for automatically generating a service request by a sold terminal in response to an instruction input by a user of the sold terminal, the method, comprising:

acquiring, by a terminal, a service processing instruction inputted by a user, wherein the terminal is a sold terminal via which the user inputs the service process instruction;

generating, by the terminal, a service processing request according to the service processing instruction, wherein the service processing request comprises a unique identifier of a terminal;

sending, by the terminal, the service processing request to a server, to enable the server to query, according to the unique identifier of the terminal in the service processing request, an on-sale data maintenance list for product information corresponding to the unique identifier of the terminal, wherein the on-sale data maintenance list records a correspondence between a unique identifier of at least one sold terminal and product information corresponding to the unique identifier of the at least one sold terminal; and to process, according to the product information corresponding to the unique identifier of the terminal, a service requested by the service processing request.

6. The method according to claim 5, wherein the unique identifier comprises one of an International Mobile Equipment Identity (IMEI) code, an Emergency Service Number (ESN) code, a Mobile Equipment Identifier (MEID) code, or a Serial Number (SN) code.

7. A data processing method for processing a service request received from a sold terminal sent in response to an instruction input by a user of the sold terminal, the method, comprising:

receiving, by a server, a service processing request sent by a terminal, wherein the service processing request comprises a unique identifier of the terminal, wherein the terminal is a sold terminal via which a user inputs a service process instruction, the terminal having generated the service processing request in response to the service processing instruction;

querying, by the server, according to the unique identifier of the terminal in the service processing request, an on-sale data maintenance list for product information corresponding to the unique identifier of the terminal, wherein the on-sale data maintenance list records a correspondence between a unique identifier of at least one sold terminal and product information corresponding to the unique identifier of the at least one sold terminal; and processing, by the server, according to the product information corresponding to the unique identifier of the terminal, a service requested by the service processing request.

8. The method according to claim 7, wherein the service processing request is a refund service request; the product information comprises a product price and a payment account corresponding to the terminal; and the processing, according to the product information, the service requested by the service processing request comprises:

performing refund processing of the terminal according to the product price and the payment account.

9. The method according to claim 7, wherein the service processing request is a software update service request; the product information comprises an operating system update software package corresponding to an operating system of the terminal; and the processing, according to the product information, the service requested by the service processing request comprises:

sending the operating system update software package to the terminal, so that the terminal updates the operating system of the terminal according to the operating system update software package.

10. The method according to claim 7, wherein the unique identifier comprises one of an International Mobile Equipment Identity (IMEI) code, an Emergency Service Number (ESN) code, a Mobile Equipment Identifier (MEID) code, or a Serial Number (SN) code.

11. A data processing system, comprising:
a terminal, configured to:
acquire a service processing instruction inputted by a user, wherein the terminal is a sold terminal via which a user inputs the service process instruction,
generate a service processing request according to the service processing instruction, wherein the service processing request comprises a unique identifier of the terminal; and
send the service processing request to a server; and
the server, configured to:
receive the service processing request;
store an on-sale data maintenance list, wherein the on-sale data maintenance list records a correspondence between a unique identifier of at least one sold terminal and product information corresponding to the unique identifier;
query, according to the unique identifier of the terminal in the service processing request, the on-sale data maintenance list for product information corresponding to the unique identifier of the terminal; and
process, according to the product information corresponding to the unique identifier of the terminal, a service requested by the service processing request.

12. The system according to claim 11, wherein the service processing request is a refund service request; the product information comprises a product price and a payment account corresponding to the terminal; and the server is configured to:
perform refund processing of the terminal according to the product price and the payment account.

13. The system according to claim 11, wherein the service processing request is a software update service request; the product information comprises an operating system update software package corresponding to the terminal; and the server is configured to:
send the operating system update software package to the terminal, so that the terminal updates an operating system of the terminal according to the operating system update software package.

14. The system according to claim 11, wherein the unique identifier comprises one of an International Mobile Equipment Identity (IMEI) code, an Emergency Service Number (ESN) code, a Mobile Equipment Identifier (MEID) code, or a Serial Number (SN) code.

15. A server, comprising:
a memory storing instructions; and
a processor coupled to the memory to execute the instructions to:
receive a service processing request sent by a terminal, wherein the service processing request comprises a unique identifier of the terminal, wherein the terminal is a sold terminal via which a user inputs a service process instruction, the terminal having generated the service processing request in response to the service processing instruction;
query, according to the unique identifier of the terminal in the service processing request, an on-sale data maintenance list for product information corresponding to the unique identifier of the terminal, wherein the on-sale data maintenance list records a correspondence between a unique identifier of at least one sold terminal and product information corresponding to the unique identifier of the at least one sold terminal; and
process, according to the product information corresponding to the unique identifier of the terminal, a service requested by the service processing request.

16. The server according to claim 15, wherein the service processing request is a refund service request; the product information comprises a product price and a payment account corresponding to the terminal; and the processor to execute the instructions to:
performing refund processing of the terminal according to the product price and the payment account.

17. The server according to claim 15, wherein the service processing request is a software update service request; the product information comprises an operating system update software package corresponding to an operating system of the terminal; and the processor to execute the instructions to:
send the operating system update software package to the terminal, to enable the terminal to update the operating system of the terminal according to the operating system update software package.

18. A terminal, comprising:
a memory storing instructions; and
a processor coupled to the memory to execute the instructions to:

acquire a service processing instruction inputted by a user, wherein the terminal is a sold terminal via which the user inputs the service process instruction;

generate a service processing request according to the service processing instruction, wherein the service processing request comprises a unique identifier of a terminal;

sending the service processing request to a server, wherein the service processing request carries the unique identifier of the terminal and the requested service, and the unique identifier of the terminal is used to query an on-sale data maintenance list for product information by the server, wherein the on-sale data maintenance list records a correspondence between a unique identifier of at least one sold terminal and product information corresponding to the unique identifier of the at least one sold terminal.

19. The terminal according to claim 18, wherein the unique identifier comprises one of an International Mobile Equipment Identity (IMEI) code, an Emergency Service Number (ESN) code, a Mobile Equipment Identifier (MEID) code, or a Serial Number (SN) code.

* * * * *